Aug. 15, 1933.  E. R. HOLMES ET AL  1,923,054
PROPELLER
Filed Dec. 9, 1932   2 Sheets-Sheet 1
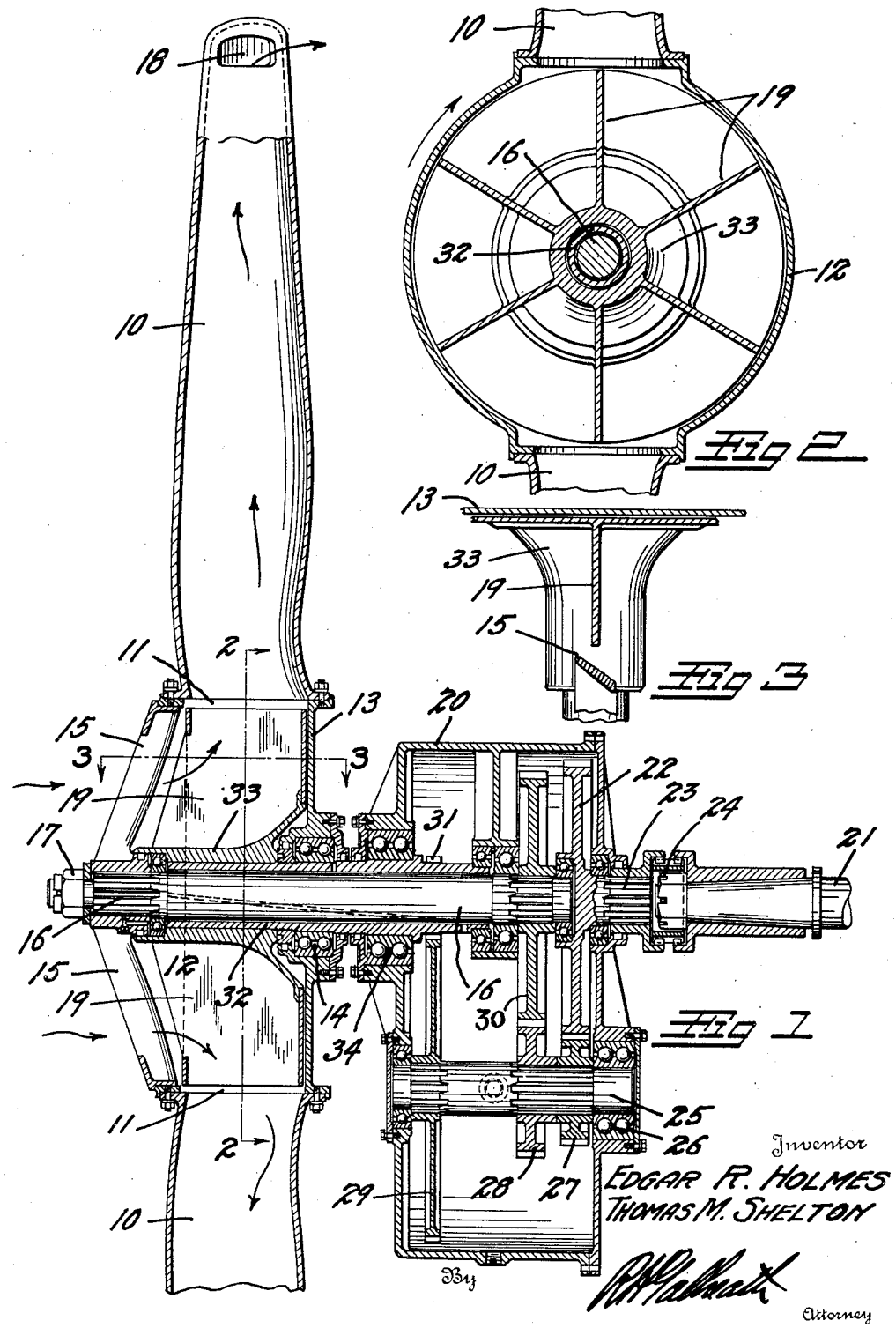

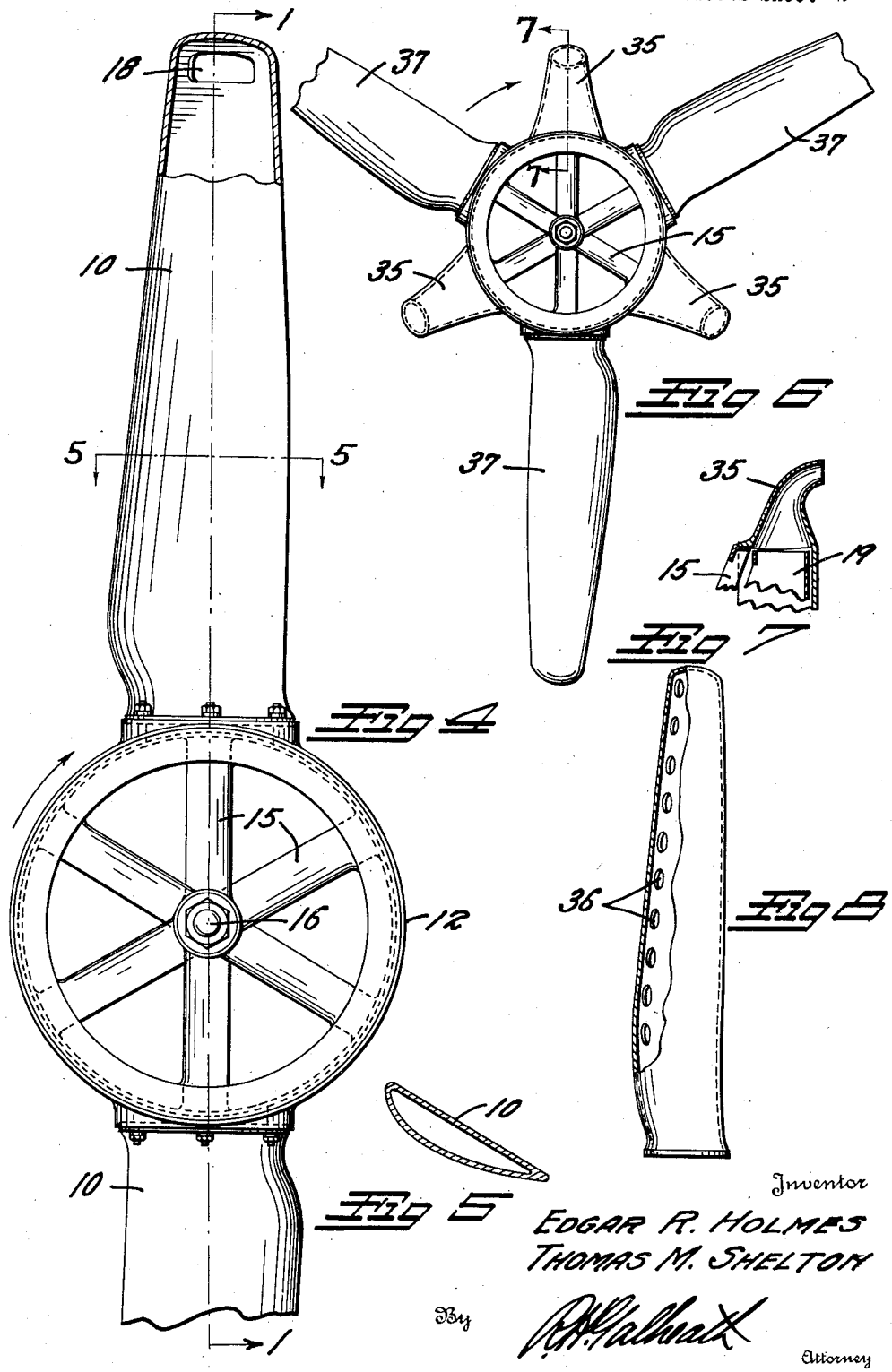

Patented Aug. 15, 1933

1,923,054

UNITED STATES PATENT OFFICE 1,923,054

PROPELLER

Edgar R. Holmes and Thomas M. Shelton, Denver, Colo., assignors to The American Gyro Co., Denver, Colo., a Corporation of Colorado Application December 9, 1932. Serial No. 646,510

9 Claims. (Cl. 170—172)

This invention relates to an improvement in air craft propulsion and has for its principal object the provision of an aircraft propeller of far greater efficiency than the present types of propellers.

Another object of the invention is to provide means for utilizing the usual, useless dead air space adjacent the axis of the propeller in such a way as to increase the efficiency of the entire propeller. The axial portion of the ordinary propeller has such a low lineal speed and is so obstructed by hub structure that it exerts no propelling effect. It may in fact act to increase the resistance or drag of the aircraft to forward motion in the air. In the present invention this usually useless axial portion is not only made to exert a propelling effect, but it is also utilized in such a way as to increase the efficiency of surrounding propeller blades.

Other objects and advantages reside in the detail construction of the invention, which is designed for simplicity, economy, and efficiency. These will become more apparent from the following description.

In the following detailed description of the invention reference is had to the accompanying drawings which form a part hereof. Like numerals refer to like parts in all views of the drawings and throughout the description.

In the drawings:

Fig. 1 is a vertical section through a typical embodiment of the invention. The section in this view is taken on the line 1—1, Fig. 4.

Fig. 2 is a vertical section through the hub portion of the propeller, taken on the line 2—2, Fig. 1.

Fig. 3 is a horizontal detail section taken on the line 3—3, Fig. 1.

Fig. 4 is a front view of the propeller of Fig. 1.

Fig. 5 illustrates a cross section through the propeller blade of Fig. 4, being taken on the line 5—5 therein.

Fig. 6 is a front view of an alternate form of the invention.

Fig. 7 is a detail section taken on the line 7—7, Fig. 6.

Fig. 8 illustrates an alternate form of propeller blade which may be employed with the invention.

The drawings illustrate several preferred embodiments of the invention. It is possible, of course, that there may be several other embodiments and forms thereof. A description of these preferred embodiments will give an understanding, however, of the basic principles involved in the present invention.

In the form of Fig. 1, two hollow propeller blades 10, preferably of metal, are employed. The blades 10 are secured over discharge openings 11 in a hollow hub 12. The rear face of the hub 12 is closed by means of a suitable back plate 13 supported from a suitable ball bearing 14. The front of the hub 12 is open, the opening being spanned by the legs of a supporting spider 15. The spider 15 is keyed or otherwise secured on the forward extremity of a propeller shaft 16 and may be locked in place thereon by means of a suitable lock nut 17. The propeller blades 10 are provided with suitable discharge openings 18 adjacent their tips and on the pressure faces thereof communicating with the hollow interior.

The invention as thus far described, is valuable and practical without the remaining structure to be described. The blades 10 have substantially the same active pressure area as the usual propeller, but the usually idle axial portion is also utilized. The rapid rotation of the blades causes the hollow blades to centrifugally discharge their contained air under a relatively high pressure from the tip discharge openings 18. This creates a partial vacuum in the hub 12 which will cause air to be drawn inwardly through the open front face thereof.

This serves a triple purpose: First, it removes the usual turbulent back pressure zone from in front of the propeller hub which ordinarily exerts a resistance to forward motion of the aircraft; second, it creates a vacuum zone in front of the propeller which greatly increases the efficiency of the propeller as a whole, and; third, the air discharging from the pressure faces of the blades 10 greatly increases the density of the air against which the blades 10 are acting and correspondingly increases the reactive or propelling effect of the blades.

The above effects can be further increased by forming the legs of the spider 15 as an air screw with an aerofoil section such as indicated in Fig. 3. This creates in effect a smaller propeller in the hub area of the large blades 10 which greatly increases the velocity of the air being drawn into the hollow hub 12 and correspondingly increases the forward vacuum and after pressure effect above described.

The above effects can be still further increased by mounting a series of reactor impellor blades 19 within the hollow hub 12 and rotating these blades at a relatively high speed. This causes the hub 12 to have an action similar to usual blower, that is, it will intake air through the open front and discharge this air into the blades 10, thus greatly increasing the pressure of the air discharging from the discharge openings 18.

In order to obtain effective results from the impeller blades 19, they should be rotated at a higher speed than the propeller blades 10. One construction for accomplishing this is illustrated in Fig. 1, in which a gear box 20 is positioned between an engine shaft 21 and the propeller shaft 16. The gear box 20 carries a drive gear 22 which is driven from a stud shaft 23 arranged to be clutched to the engine shaft 21 through the medium of any suitable universal clutch 24. A countershaft 25 is journalled in the gear box 20 on suitable bearings 26. This countershaft is driven through the medium of the drive gear 22 and a drive pinion 27. The countershaft 25 carries a propeller drive pinion 28 and a reactor drive gear 29 which mesh with a propeller driven gear 30 and a reactor driven pinion 31, respectively.

The propeller driven gear 30 is keyed on the extremity of the propeller shaft 16. The reactor driven pinion 31 is secured on a reactor sleeve 32 which is arranged to rotate about the propeller shaft 16 and extend within the hollow hub 12. Within the hub the reactor impeller blades 19 are mounted on a conical impeller hub 33 which is secured on the sleeve 32. The conical shape of the impeller hub 33 serves to guide the incoming air outwardly toward the discharge openings 11 with a minimum of friction.

With the above construction it will be noted that, as the engine shaft 21 rotates, the propeller blades 10 will be rotated through the medium of the gears and pinions 22, 27, 28 and 30. As illustrated, the ratio between the gears and pinions 22 and 27, and the pinion and gear 28 and 30, is such that the propeller will rotate at a relatively higher speed than the rotative speed of the engine shaft 21. This, of course, is optional as it could be arranged to rotate at the same or a slower speed, if desired. The engine shaft could continue through as a common shaft to the spider 15 and the gear and pinion 30 and 28 could be eliminated if a step up ratio were not desired.

The rotation of the engine shaft is also carried through the gear 29 and pinion 31 to the sleeve 32 thence to the reaction blades 19. It will be noted that the ratio between the gear 29 and the pinion 31 is such that the reactor blades will rotate at a much higher speed than the propeller blades 10. This high speed is of course desirable owing to the relatively small diameter of the hub 12.

The vertical weight of the propeller is preferably supported from the gear box 20 in suitable ball bearings 34 which also act to absorb the major portion of the propeller thrust. As above illustrated and described, the air intaken by the hub is discharged on the pressure side of the wing tips. It is conceivable of course that the air could be discharged at any other desired point or points.

An alternate method of discharging the air is illustrated in Fig. 6 in which a three bladed propeller 37 is employed. The discharging, high pressure air from the hub is directed rearwardly through curved nozzles 35 mounted upon the hub intermediate the propeller blades. This rearwardly discharging air will, of course have a reactive propelling effect and will also serve to create a zone of higher pressure in the rear of the rotating propeller 37 which will greatly increase the propelling effect.

Still another method of discharging the pressure air is illustrated in Fig. 8, in which, it is discharged throughout the length of the propeller blade adjacent the leading edge and on the pressure face thereof as through the openings 36. This forms a film of high pressure air on the pressure face of the propeller which reduces the air friction and skin effect thereon and also increases the density of the reacting pressure area in the rear of the blades. This feature can be used to effect boundary layer control.

While the invention has been described as particularly adaptable to an air propeller for aircraft it also would be useful in any installation where it was desired to propel, or react on, gases or fluids.

While a specific form of the improvement has been described and illustrated herein, it is desired to be understood that the same may be varied, within the scope of the appended claims, without departing from the spirit of the invention.

Having thus described the invention, what is claimed and desired secured by Letters Patent is:—

1. A propeller comprising: a hollow hub portion; a series of propeller blades extending radially outward from said hub portion; and means for drawing air into said hollow hub portion through the forward face thereof and discharging said air rearwardly thereof, said means comprising an independently rotatable impeller within said hollow hub portion and in the plane of said propellers and means for rotating said impeller.

2. A propeller construction comprising: a hollow hub portion; hollow propeller blades extending radially outward from said hollow hub portion and communicating with the hollow interior thereof, said blades being provided with air discharge openings, said hollow hub portion being open at its forward face to allow air to enter and be discharged from said discharge openings; an impeller rotatively mounted in said hollow hub portion; and means for rotating said impeller relative to the rotation of said propeller to force air from said hub into said blades to said discharge openings.

3. A propeller construction comprising: a hollow hub portion; hollow propeller blades extending radially outward from said hollow hub portion and communicating with the hollow interior thereof, said blades being provided with air discharge openings, said hollow hub portion being open at its forward face to allow air to enter and be discharged from said discharge openings; and pitched surfaces in said open forward face acting to draw air therethrough into said hollow hub portion; an impeller rotatively mounted for relative rotation in said hollow hub portion; and means for rotating said impeller at a higher speed than the speed of said propeller to force air from said hub into said blades to said discharge openings.

4. A propeller construction comprising: a hollow hub portion having openings in its periphery and an open forward face; hollow propeller blades positioned over the openings in the periphery of said hub portion, said blades being provided with air discharge openings; a reactor impeller mounted in said hollow hub; and means for driving said reactor impeller at a higher speed than the speed of rotation of said propeller so as to discharge air into said blades and through said discharge openings.

5. A propeller construction comprising: a propeller shaft; a hollow hub having an open front supported from and about said shaft; an impeller sleeve rotatively surrounding said shaft; an impeller mounted on said sleeve within said hub; propeller blades mounted on said hub; means for discharging air from the periphery of said hub; and means for rotating said sleeve at a different speed than the speed of rotation of said propeller shaft.

6. A propeller comprising: a hollow hub; hollow propeller blades extending outwardly from said hollow hub; a back plate closing the back of said hub; a spider supporting the front of said hub; a propeller shaft, said spider being secured to said propeller shaft; and a bearing in said back plate for supporting the rear portion of said hub from said propeller shaft.

7. A propeller comprising: a hollow hub; hollow propeller blades extending outwardy from said hollow hub; a back plate closing the back of said hub; a spider supporting the front of said hub; a propeller shaft, said spider being secured to said propeller shaft; a bearing in said back plate for supporting the rear portion of said hub from said propeller shaft; a sleeve surrounding said shaft and independently rotatable therefrom, said bearing riding upon said sleeve; vanes projecting outwardly from said sleeve; and means for rotating said sleeve independently of the rotation of said shaft so as to cause said vanes to force air into said hollow propeller blades.

8. A propeller comprising: a hollow hub; hollow propeller blades extending outwardly from said hollow hub; a back plate closing the back of said hub; a spider supporting the front of said hub; a propeller shaft, said spider being secured to said propeller shaft; a bearing in said back plate for supporting the rear portion of said hub from said propeller shaft; a sleeve surrounding said shaft and independently rotatable therefrom, said bearing riding upon said sleeve; vanes projecting outwardly from said sleeve; and means for rotating said sleeve independently of the rotation of said shaft so as to cause said vanes to force air into said hollow propeller blades; a relatively large driven gear carried by said shaft; a relatively small driven gear carried by said sleeve; a counter shaft and gears secured on said counter shaft meshing with said driven gears so that when said counter shaft is rotated, said propeller shaft and said sleeve will be rotated at relative speeds and in a common direction.

9. In a propeller having a hollow hub portion and hollow blades communicating therewith, there being openings in said blades for the discharge of air; means for forcing air from said hollow hub portion into said blades comprising: a re-actor impeller mounted in said hub so as to rotate in the same plane as said propeller but independently thereof; and means for driving said re-actor impeller at a higher rotative speed than said propeller.

EDGAR R. HOLMES.
THOMAS M. SHELTON.